United States Patent [19] [11] 3,708,634
Vantill et al. [45] Jan. 2, 1973

[54] TELEPHONE HAND TEST SET

[75] Inventors: Martinus Pieter Richard Vantill; Graham Stirling Laing; Donald Mack Lounsbury, all of Ontario, Canada

[73] Assignee: Northern Electric Company Limited, Montreal, Quebec, Canada

[22] Filed: Nov. 9, 1971

[21] Appl. No.: 196,993

[52] U.S. Cl. ....................179/175, 179/103
[51] Int. Cl. ....................H04m 1/24
[58] Field of Search...179/175, 103, 175.1 R, 175.11

*Primary Examiner*—Ralph D. Blakeslee
*Assistant Examiner*—Douglas W. Olms
*Attorney*—John E. Mowle

[57] ABSTRACT

A telephone test set or hand test set which automatically returns to a relatively high impedance monitor mode when disconnected from a telephone line. After finding an idle telephone line with the hand test set in the monitor mode, a relatively low impedance talking circuit is shunted across the telephone line by manually gating and firing a controlled rectifier. When the hand test set is disconnected, on completion of the call, the controlled rectifier ceases conducting and effectively disconnects the talking circuit.

14 Claims, 1 Drawing Figure

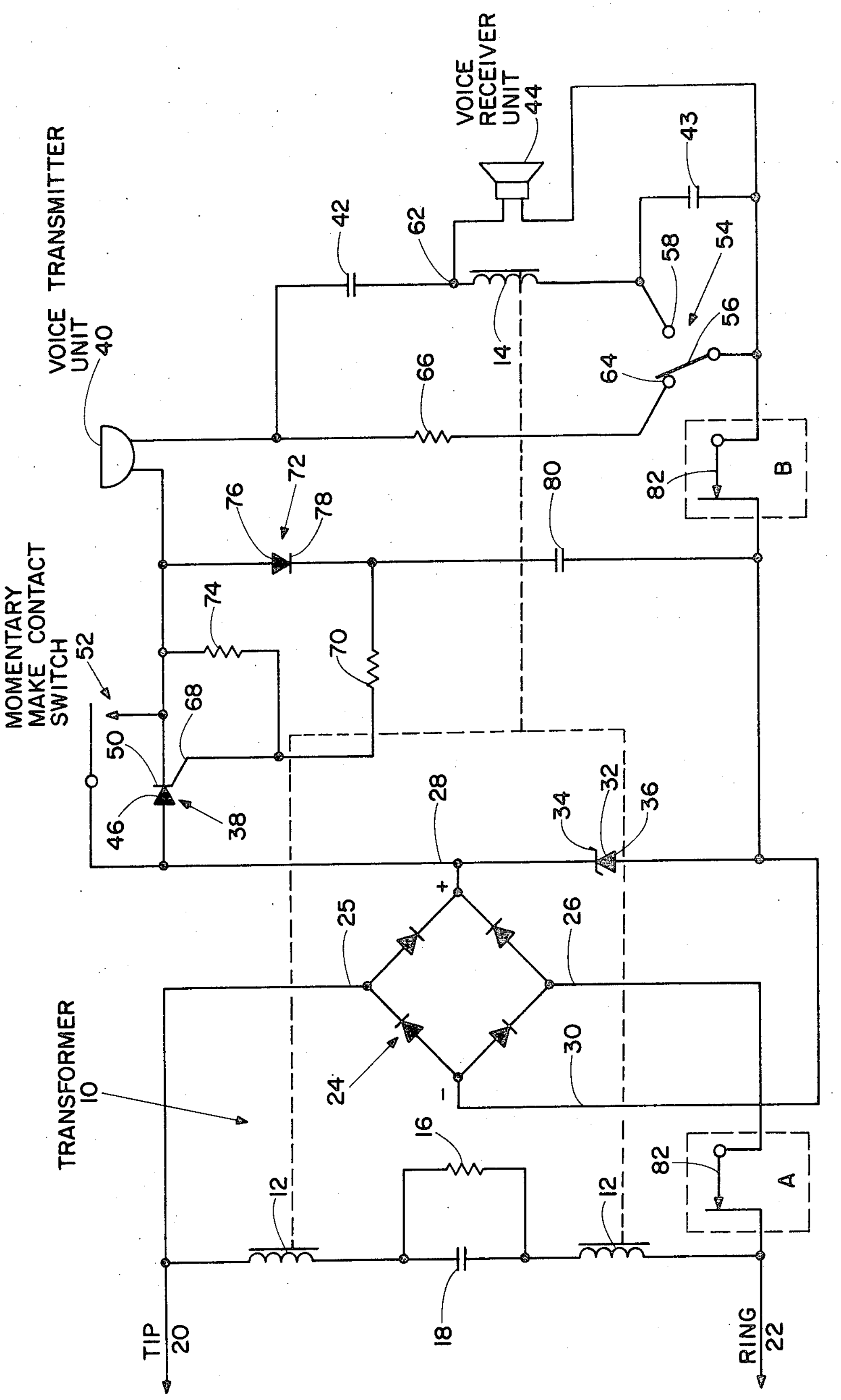
VOICE TRANSMITTER UNIT 40
VOICE RECEIVER UNIT 44
MOMENTARY MAKE CONTACT SWITCH 52
TRANSFORMER 10
TIP 20
RING 22
A
B
42
43
62
58
54
56
64
66
14
72
76
78
80
82
74
70
68
50
46
38
28
34
32
36
25
26
24
30
16
12
18
+
-

TELEPHONE HAND TEST SET

FIELD OF THE INVENTION

This invention relates to telephone handsets of the type used to originate test calls on dial system apparatus, and more particularly to a telephone test set or hand test set having an input impedance which rises automatically when the hand test set is disconnected from a line under test.

DESCRIPTION OF THE PRIOR ART

Hand test sets have been used for many years by telephone linesmen, installers and maintenance personnel as a convenient way of originating calls at a telephone central office or subscriber location to test switching continuity and talking characteristics of a particular line circuit. In addition the hand test set has also served in its more obvious capacity as a convenient communication means from a remote location to a telephone central office.

Until a few years ago no serious problem was created by connecting a hand test set to a working telephone line as most telephone lines were used for voice transmission. Because the loading effect of the hand test set on a telephone line was similar to the loading effect of a standard telephone set, a moderate click on the line and a slight loss in volume were the most disturbing aspects to users of a working telephone line.

To lessen the loading effect on a busy or working telephone line the common hand test set was usually provided with a rocker switch, or the like, for selecting either a relatively high input impedance monitor position or a lower input impedance talk or dial position. Although proper use of the hand test set required the user to ensure that the talk-monitor switch was in the monitor position prior to bridging a telephone line, the hand test set was frequently accidentally connected to a busy telephone line in its lower impedance state.

In recent years however, telephone lines have been increasingly used to transmit data and program information. If a hand test set, in its low impedance state, is bridged across such a busy telephone line circuit the resulting amplitude and phase changes imparted to the transmitted signals can cause serious transmission errors. Transmission errors also arose from proper use of hand test sets or circuits carrying data as the input impedance of the most older hand test sets was too low even in the higher impedance monitor mode.

Accordingly, new hand test sets were designed. Each of these new test sets incorporated a transformer in order to effectively increase its input impedance as seen by a telephone line when the hand test set was in the monitor mode. Although these modified hand test sets presented a high input impedance while in the monitor mode due to the impedance rise resulting from the use of a transformer in each, the danger however, of bridging a working telephone line carrying data with a hand test set in its talk position remained. To safeguard against careless use it became increasingly desirable to have a hand test set which returned automatically to a high impedance monitor position once said hand test set was removed from a telephone line.

SUMMARY OF THE INVENTION

It was found that a controller rectifier such as a silicon controlled rectifier (SCR) could be placed in series with the talk circuit of the hand test set so as to provide a low impedance direct current path for talking which would automatically return to a high impedance position once the hand set was disconnected. This controlled rectifier would form part of a direct current series circuit including a voice transmission unit and dial pulse contacts, while a voice receiver unit would be arranged to monitor a telephone line irrespective of the conductive status of the controlled rectifier.

Thus in accordance with the present invention the telephone test set, which is provided with tip and ring conductors for connection to a telephone line, comprises a transformer having a primary and a secondary winding, the primary winding of said transformer being connected across the tip and ring conductors. A diode bridge having a pair of input and a pair of output terminals is connected via the input terminals across the tip and ring conductors. A controlled rectifier and a voice transmitter unit forms a series circuit across the output terminals of the diode bridge with the controlled rectifier poled to carry current from the higher potential output terminal to the lower potential output terminal of said diode bridge. A voice receiver unit is connected across the secondary winding of the transformer and a momentary contact switch is provided for gating the controlled rectifier to turn on the controlled rectifier when the tip and ring conductors are connected to a telephone line.

BRIEF DESCRIPTION OF THE DRAWING

An example embodiment of the invention will now be described with reference to the accompanying schematic drawing of a telephone test set or hand test set in accordance with the present invention.

DESCRIPTION OF THE PREFERRED EMBODIMENT

The telephone test set or hand test set comprises a transformer 10 having a primary winding 12 and a secondary winding 14. The primary winding 12 is composed of two separate windings serially connected via a network formed by a resistor 16 and a capacitor 18 in shunt. The primary winding 12 is connected across tip and ring conductors (20 and 22 respectively) which serve as contact means for connecting the hand test set to a telephone line (the telephone line is not shown). A diode bridge 24 has its input terminals 25 and 26 connected to a telephone tip 20 and ring 22 conductors respectively, and its output terminals 28 and 30 connected across a voltage threshold diode such as a zener diode 32. The cathode 34 of the zener diode 32 is connected to the higher potential output terminal 28 of the diode bridge 24, while the anode 36 is connected to the lower potential output terminal 30 of said bridge. A controlled rectifier 38, a voice transmission unit 40, a coupling capacitor 42, and a receiver unit 44 comprise a series circuit which is connected across the zener diode 32.

The anode 46 of the controlled rectifier is connected to the cathode 34 of the zener diode 32, while the voice receiver unit 44 is connected to the coupling capacitor 42 and to the lower potential terminal 30 of the diode bridge 24. The voice transmitter unit 40 is connected to the cathode 50 of the controlled rectifier 38 and to the coupling capacitor 42. A momentary make contact switch 52 is connected across the anode 46 and cathode 50 of the controlled rectifier 38. A selector switch 54 has its common terminal 56 connected to the anode 36 of the zener diode 32. A first selection contact 58 is connected to one end 60 of the secondary winding 14 of the transformer 10 while the other end 62 of said transformer 10 is connected to the junction of the coupling capacitor 42 and the voice receiver unit 44.

A second selection contact 64 is connected via an attenuating resistor 66 to the junction of the voice transmitter unit 40 and the coupling capacitor 42. The selection switch 54 has a single pole double throw contact arrangement to alternately establish an electrical connection between the common terminal 56 and one of the first and second selection contacts (58 and 64 respectively). A single pole double throw rocker type switch is used in the preferred embodiment as the selector switch 54. A bypass capacitor 43 is connected across common terminal 56 and the first selection terminal 58 of the selector switch 54.

The cathode 50 of the controlled rectifier 38 is connected to the gate 68 of said rectifier through a first resistor 70 in series with a diode 72. A second resistor 74 provides another connection path from the gate 68 to the cathode 50 of the controlled rectifier 38. The anode 76 of the diode 72 is connected to the cathode 50 of the controlled rectifier 38 while the junction of the cathode 78 of the diode 72 and the first resistor 70 is connected via a storage capacitor 80 to the lower potential terminal 30 of the diode bridge 24. Locations A and B are alternate locations along the series circuit at which dial pulse contacts 82 may be placed. Primarily the dial pulse contacts 82 must be placed in the series circuit so as to interrupt the direct current line current. Location A is a typical location on the line side of the diode bridge 24 while location B is a typical location on the load side of the diode bridge 24. The controlled rectifier 38 should have characteristics suitable for gating and firing with the commonly used central office battery potential (48 volts nominal) which may range from 40 to 50 volts depending on battery load and state of charge. The zener diode 32 is chosen to prevent voltage spikes on the telephone line from exceeding the reverse breakdown levels of the controlled rectifier 38.

OPERATION OF THE PREFERRED EMBODIMENT

In its operation the test set is connected via its tip 20 and ring 22 conductors to a telephone line (the telephone line is not shown in the single figure). As the telephone line will usually carry a no-load potential of approximately −48 volts, one of the line conductors will be positive with respect to the other. Let us assume that the tip conductor of the hand test set is positive with respect to the ring conductor of said test set as a result of the tip and ring conductors being respectively connected to positive and negative leads of a telephone line. When a suitable connection is established, line current will flow from the tip conductor through part of the primary winding 12 of the transformer 10, thence through the parallel combination of the capacitor 18 and the resistor 16 and on through the other part of the primary winding to the ring conductor. Although a small fraction of the direct current portion of the line current will flow through the primary winding 12 of the transformer 10 via resistor 16, the greatest will flow through the diode bridge 24 when the controlled rectifier 38 is conducting. The diode bridge 24 serves to ensure that the voltage appearing across the anode 46 of the controlled rectifier 38 is positive with respect to the voltage across the cathode 50 of said controlled rectifier 38 irrespective of the relative interconnection of the hand test set and a telephone line. The zener diode 36 serves to protect the controlled rectifier 38 against reverse breakdown voltage arising from voltage transients appearing on the telephone line.

Initially when the hand test set is connected to a telephone line the controlled rectifier 38 is in its non-conducting state. If the line is busy, voice signals will flow through the two portions of the primary winding 12 via capacitor 18 and a corresponding signal voltage will be induced in the secondary winding 14. If the selector switch 54 (usually a rocker switch) is in the monitor position, the voice receiver unit 44 will be connected across the secondary winding 14 via common terminal 56 and first selector contact 58 of the selector switch 54. The higher number of primary turns relative to the number of secondary turns of the transformer 10 is used to achieve a high input impedance monitor condition. If the hand test set is connected to a telephone line while the selector switch 54 is in the talk position, the user can still monitor the line because by-pass capacitor 43 shunts the common terminal 56 to the first selector terminal 58 of the selector switch 54. Such a connection does not disturb a busy line however, as the hand test set presents a high impedance to the monitored line as long as the controlled rectifier 38 remains its its non-conducting state. When the selector switch 54 is switched to the monitor position a normal signal monitor level results as the attenuating resistor 66 no longer shunts the voice receiver unit 44.

In order to dial or to talk, a low impedance direct current path must be established across the telephone line being used. This low impedance path must include the dial pulse contacts and the voice transmitter unit. A low impedance circuit or direct current path established across the output or load side of the diode bridge 24 (equivalently across zener diode 32) will provide the necessary load for the telephone line as seen through the diode bridge 24. If the selector switch 54 is in its talk position, as shown in the single drawing, current will flow, when the momentary contact switch 52 is closed, from the positive output terminal 28 of the diode bridge 24 through the contacts of said momentary contact switch 52, the voice transmitter unit 40, the attenuating resistor 66, the second select contacts 64 of the selector switch 54 (and the dial pulse contacts 82 if they are located at A) to the negative or lower potential output terminal 30 of the diode bridge 24. While the momentary contact switch 52 is closed, current will also flow through the diode 72 to charge the storage capacitor 80. The voltage appearing across the diode bridge 24, output terminals 28, 30 will essentially appear across the storage capacitor 80 once the storage capacitor 80 has been charged through the diode 72.

When the momentary contact switch 52 is released the voltage rises across the anode cathode junction of the controlled rectifier 38. This voltage rise serves to fire the controlled rectifier 38 which is being supplied with gate current from the voltage appearing at the storage capacitor 80 through the first resistor 70.

The voice transmitter unit 40 serves to modulate the current flowing through the controlled rectifier 38 during a conversation and in so doing modulates the current flowing along the telephone line onto which the hand test set is connected. The coupling capacitor 42 and the by-pass capacitor 43 couple a portion of the transmitted signal developed across the attenuating resistor 66 into the voice receiver unit 44 during voice transmission to provide the usual sidetone effect. A portion of the incoming receive signal which develops across the attenuating resistor 66 is coupled to the voice receiver 44 when the second select contacts 64 are closed.

Although the current flowing across the anode-cathode junction of the controlled rectifier 38 is momentarily interrupted during the dialling operation, the charge present in the storage capacitor 80 continues to supply gate current to the gate 68 of the controlled rectifier through the first resistor 70, as the time constant of the storage capacitor 80 and the first resistor 70 is calculated to supply gate current to the controlled rectifier 38 during the dialling operation. When the telephone line voltage reappears across the controlled rectifier 38, during the interdigit intervals and during the interval between pulses of each digit, the controlled rectifier 38 is automatically refired. If the line current is interrupted for a longer interval, which may result from temporarily removing the handset from a line under test or switching the selector switch 54 to its monitor position, the charge stored in the storage capacitor 80 will be insufficient to supply gate current to the controlled rectifier 38 over this interval and the controlled rectifier 38 will not automatically refire when the line voltage reappears across its anode-cathode junction.

If the controlled rectifier 38 fails to fire due to abnormally low voltage across the telephone line (a condition sometimes experienced on a very long line) the controlled rectifier 38 may be shunted, to permit dialling and transmission, by manually maintaining the momentary contact switch 52 in its closed position.

What is claimed is:

1. A telephone test set having tip and ring conductors for connection to a telephone line, said test set comprising:

a. a transformer having a primary and a secondary winding, the primary winding of said transformer being connected across the tip and ring conductors;

b. a diode bridge having a pair of input terminals and a pair of output terminals, said input terminals being connected across the tip and ring conductors;

c. a controlled rectifier and a voice transmitter unit forming a series circuit, said series circuit being connected across the output terminals of the diode bridge with the controlled rectifier poled for carrying current in the direction allowed by the diode bridge;

d. a voice receiver unit connected across the secondary winding of the transformer;

e. means comprising a momentary contact switch for gating the controlled rectifier to turn on said controlled rectifier when the tip and ring conductors of the test set are connected to a telephone line.

2. A telephone test set having tip and ring conductors for connection to a telephone line, said test set comprising:

a. a transformer having a primary and a secondary winding the primary winding of said transformer being connected across the tip and ring conductors;

b. a diode bridge having a pair of input terminals and a pair of output terminals, said input terminals being connected across the tip and ring conductors;

c. a controlled rectifier forming a series circuit with a voice transmitter unit, a coupling capacitor and the secondary winding of the transformer, said series circuit being connected across the output terminals of the diode bridge with said controlled rectifier being poled to carry current in the direction allowed by said bridge;

d. a voice receiver unit connected across the secondary winding of the transformer;

e. means for bypassing the coupling capacitor to provide a direct current path across the diode bridge output terminals through the controlled rectifier and the voice transmitter unit;

f. means incorporating a momentary contact switch for gating the controlled rectifier to turn on said controlled rectifier and thereby establish said direct current path when the test set is connected to a telephone line.

3. The invention as defined in claim 1 wherein said series circuit further comprises an attenuation network, the secondary winding of the transformer being connected across said attenuation network via a coupling capacitor.

4. The invention as defined in claim 3 further comprising a selector switch, the common contact of said switch forming part of said series circuit, whereby either the attenuating network or the series combination of the coupling capacitor and the transformer secondary winding can be excluded from said series circuit by actuating said switch.

5. The invention as defined in claim 4 wherein the attenuation network is an attenuating resistor.

6. The invention as defined in claim 2 further comprising dial pulse contacts in series with said series circuit.

7. The invention as defined in claim 1 wherein the primary winding of the transformer has a greater number of turns than the secondary winding of the transformer.

8. The invention as defined in claim 2 wherein the primary winding of the transformer has a greater number of turns than the secondary winding of the transformer.

9. The invention as defined in claim 1 wherein the means for gating the controlled rectifier comprises:

a. a momentary contact switch for momentarily connecting the anode and the cathode of the controlled rectifier;

b. a diode in series with a first resistor, joining the cathode and gate of the controlled rectifier, said diode being poled to pass current from the cathode to the gate of the controlled rectifier, the cathode of said diode being connected to said first resistor;

c. a second resistor joining the gate and the cathode of the controlled rectifier;

d. a storage capacitor joining the cathode of said diode to the lower potential output terminal of the diode bridge output terminals.

10. The invention as defined in claim 2 wherein the means for gating the controlled rectifier comprises:

a. a momentary contact switch for momentarily connecting the anode and the cathode of the controlled rectifier;

b. a diode in series with a first resistor, joining the cathode and gate of the controlled rectifier, said diode being poled to pass current from the cathode to the gate of the controlled rectifier, the cathode of said diode being connected to said first resistor;

c. a second resistor joining the gate and the cathode of the controlled rectifier;

d. a storage capacitor joining the cathode of said diode to the lower potential output terminal of the diode bridge output terminals.

11. The invention as defined in claim 3 wherein the attenuation network is an attenuation resistor and wherein the invention further comprises:

a. a selector switch forming part of said series circuit whereby by actuating said switch, said series circuit can be restricted to include either the attenuation resistor or the series combination of the coupling capacitor and the transformer secondary winding;

b. a momentary contact switch for momentarily connecting the anode and the cathode of the controlled rectifier;

c. a diode in series with a first resistor, the anode of the diode being connected to the cathode of the controlled rectifier and the cathode of the diode being connected through the first resistor to the gate of the controlled rectifier;

d. a second resistor joining the gate to the cathode of the controlled rectifier;

e. a storage capacitor joining the junction of the cathode of said diode and the first resistor to the lower potential output terminal of the diode bridge output terminals.

12. A telephone set having tip and ring conductors for connection to a telephone line, said test set comprising:

a. a transformer having a primary and a secondary winding, the primary winding having a greater number of turns than the secondary winding, the primary winding being connected across the tip and ring conductors;

b. a diode bridge having a pair of input terminals and a pair of output terminals, said input terminals being connected across the tip and ring conductors;

c. a series circuit formed by a controlled rectifier, a voice transmitter unit, a coupling capacitor, and a voice receiver unit, said series circuit being connected across the output terminals of the bridge rectifier such that the anode of the controlled rectifier is connected to the higher potential terminal of the diode bridge output terminals, and the voice receiver unit is connected to the coupling capacitor as well as to the lower potential terminal of the diode bridge output terminals;

d. a momentary make contact switch connected across the anode and cathode of the controlled rectifier;

e. a selector switch having a first selection contact, a second selection contact, and a common contact, the common contact of the selection switch being connected to the lower potential terminal of the diode bridge, the secondary winding of the transformer joining the first selection contact of said switch to the junction of the voice receiver unit and the coupling capacitor;

f. an attenuation resistor joining the second selection contact to the junction of the voice transmitter unit and the coupling capacitor;

g. a diode in series with a first resistor, the anode of said diode being connected to the junction of the voice transmitter unit and the cathode of the controlled rectifier, the first resistor joining the gate of the controlled rectifier to the cathode of the diode, a storage capacitor joining the cathode of the diode to the lower potential terminal of the diode bridge output terminals;

h. a second resistor joining the gate to the cathode of the controlled rectifier;

13. The invention as claimed in claim 11 further comprising a selected voltage threshold diode connected across the output terminals of the diode bridge, the cathode of said threshold diode being connected to the higher potential terminal of the diode bridge output terminals.

14. The invention as claimed in claim 12 further comprising a selected voltage threshold diode connected across the output terminals of the diode bridge, the cathode of said threshold diode being connected to the higher potential terminal of the diode bridge output terminals.

* * * * *